(12) United States Patent
Wyman

(10) Patent No.: US 6,521,289 B2
(45) Date of Patent: Feb. 18, 2003

(54) METHOD FOR MAKING A PRESSURE SENSITIVE RELEASEABLE LATEX DIPPED FELT UNDERLAY

(76) Inventor: Oliver A. Wyman, 817 N. Hamilton St., Dalton, GA (US) 30720

( * ) Notice: Subject to any disclaimer, the term of this patent is extended or adjusted under 35 U.S.C. 154(b) by 72 days.

(21) Appl. No.: 09/788,554

(22) Filed: Feb. 21, 2001

(65) Prior Publication Data

US 2001/0024706 A1 Sep. 27, 2001

Related U.S. Application Data

(60) Division of application No. 09/694,061, filed on Feb. 4, 2000, which is a continuation-in-part of application No. 09/373,634, filed on Aug. 13, 1999.

(51) Int. Cl.⁷ ................................................. B05D 5/10
(52) U.S. Cl. ................. 427/207.1; 427/208; 427/208.4; 427/299; 427/372.2
(58) Field of Search .............................. 427/207.1, 208, 427/208.4, 299, 372.2

(56) References Cited

U.S. PATENT DOCUMENTS

| | | |
|---|---|---|
| 3,227,604 A | 1/1966 | Morgan |
| 3,442,731 A | 5/1969 | Anderson |
| 3,578,550 A | 5/1971 | Hoerner et al. |
| 3,586,598 A | 6/1971 | Beemer |
| 3,613,612 A | 10/1971 | Kennedy |
| 3,788,364 A | 1/1974 | Dawbarn |
| 3,895,153 A | 7/1975 | Johnston et al. |
| 3,932,328 A | 1/1976 | Korpman |
| 3,982,051 A | 9/1976 | Taft et al. |
| 4,075,377 A | 2/1978 | Aitchison et al. |
| 4,151,319 A | 4/1979 | Sackoff et al. |
| 4,234,649 A | 11/1980 | Ward |
| 4,280,171 A | 7/1981 | Huang |
| 4,336,293 A | 6/1982 | Eiden |
| 4,374,884 A | 2/1983 | Kwok et al. |
| 4,405,668 A | 9/1983 | Wald |
| 4,482,595 A | 11/1984 | Fujishita et al. |
| 4,576,665 A | 3/1986 | Machell |
| 4,650,822 A | 3/1987 | Veazey et al. |
| 4,680,209 A | 7/1987 | Zybko et al. |
| 4,695,493 A | 9/1987 | Friedlander et al. |
| 4,696,849 A | 9/1987 | Mobley et al. |
| 4,743,330 A | 5/1988 | Tillotson |
| 4,797,170 A | 1/1989 | Hoppengardner |
| 4,820,746 A | 4/1989 | Rice et al. |
| 4,849,267 A | 7/1989 | Ward et al. |
| 4,577,774 A | 6/1990 | Hoopengardner |
| 4,957,798 A | 9/1990 | Bogdany |
| 5,082,705 A | 1/1992 | Rose |
| 5,084,317 A | 1/1992 | Epple |
| 5,116,439 A | 5/1992 | Raus |
| 5,120,587 A | 6/1992 | McDermott, III et al. |
| 5,160,770 A | 11/1992 | Hoopengardner |
| 5,217,552 A | 6/1993 | Miyajima et al. |
| 5,304,268 A | 4/1994 | Hoopengadner |
| 5,382,462 A | 1/1995 | Pacione |
| 5,401,548 A | 3/1995 | Stepanek |
| 5,401,553 A | 3/1995 | Miwa et al. |
| 5,545,276 A | 8/1996 | Higgins |
| 5,565,511 A | 10/1996 | Braud et al. |
| 5,582,675 A | 12/1996 | Stepanek |
| 5,589,013 A | 12/1996 | Stepanek |
| 5,612,113 A | 3/1997 | Irwin, Sr. |
| 5,709,766 A | 1/1998 | Press et al. |
| 5,902,658 A | 5/1999 | Wyman |

*Primary Examiner*—Nasser Ahmad
(74) *Attorney, Agent, or Firm*—Edward J. Kondracki; Miles & Stockbridge P.C.

(57) ABSTRACT

A dimensionally stable carpet underlay manufactured from needle-punched fibers arranged to form a non-woven felt fabric, to which an acrylic latex pressure sensitive adhesive is applied by a dipping process that coats the surfaces of the fibers and fills the interstices between the fibers. The acrylic adhesive is applied to the felt substrate in a dip and squeeze operation, which passes a felt web through a trough of adhesive and then through an excess adhesive removal station, after which, a protective releasable polymer film is applied to the exposed adhesive surfaces prior to curing step. The acrylic adhesive is selected to exhibit sufficient tackiness to secure the carpet in place, but allowing for easy removal and not leaving a residue after removal of the carpet from the underlay or removal of the underlay from the underlying supporting floor surface.

7 Claims, 1 Drawing Sheet

METHOD FOR MAKING A PRESSURE SENSITIVE RELEASEABLE LATEX DIPPED FELT UNDERLAY

CROSS REFERENCE TO RELATED APPLICATION

This application is a divisional of U.S. patent application Ser. No. 09/694,061, filed Feb. 4, 2000, pending which is continuation-in-part of U.S. patent application Ser. No. 09/373,634, filed Aug. 13, 1999 pending.

FIELD OF THE INVENTION

The present invention relates to carpet underlays and more particularly to an underlay for releasably adhering a carpet to a floor surface.

DESCRIPTION OF RELATED ART

Carpets are frequently used to enhance the appearance of rooms by placing them at selected locations. In such situations, it is desirable to provide an underlay beneath the underside of the carpet to prevent the carpet from slipping. Such underlays may take many forms, such as jute, sponge, latex, etc.

Contract carpet used in commercial installations is frequently adhered directly to the surface on which the carpet is placed. When carpets are used on areas where the carpet is cemented or adhered directly to the floor, different considerations come into play, particularly because of the possibility of the need for replacement. It is desirable that the carpet can be removed without leaving undesirable residue from the contact cement that also needs to be removed. Thus, the ability of the underlay to release from the surface, or from the underside of a carpet to provide undercarpet access, without leaving an appreciable amount of residue on the surface is an important consideration.

Contract carpet glued or cemented directly to a cement floor is known to have an undesired hollow sound when walked on. A proper underlay should avoid this problem. It is also desirable to fabricate the underlay in various thickness', thus providing additional cushioning and shock absorbency, enhancing the luxurious feel of the carpet underfoot.

Another problem of using contact cement or glue is the increased cost of installation. The cement is placed on the floor in the wet condition and installers need to wait until the cement begins to set. Care must be exercised not to step in wet areas. The increased time of installation translates to increased cost of installation.

In application of adhesive to a felt underlay, the adhesive is sprayed on the felt. The application of the adhesive is difficult to control, because felt disguises the amount of adhesive applied. As a result, the felt frequently absorbs too much adhesive, which works excessively into the porous surfaces of the untreated felt. The adhesive could then transfer onto the pile surface of the carpet and between the fibers of the carpet. Further, if the adhesive transferred to the carpet, a high powered solvent would have to be used to clean the adhesive from the underlying carpet. This could damage carpet coloration. Further, carpet adhesives have a tendency to clog spray heads, making application thereof difficult and unnecessarily costly, due to product line interruption.

SUMMARY OF THE INVENTION

With the foregoing in mind, it is a primary object of the present invention to provide an improved pressure sensitive, releasable, carpet underlay, which may be readily applied between the undersurface of a carpet and an underlying supporting floor surface, such that the underlay can then be firmly, but releasably, adhered to both the floor and the back of the carpet, and which does not suffer the aforenoted disadvantages of glue-down carpets.

Another object of the present invention is to provide an improved pressure sensitive, releasable, carpet underlay which is releasable from the underlying surface and the carpet with no appreciable residue transferred either to the underlying supporting surface or the carpet back.

Still another object of the present invention is to provide an improved pressure sensitive, releasable, carpet underlay which minimizes installation setup time.

Another object of the present invention is to provide an improved pressure sensitive, releasable, carpet underlay which enables carpet to be readily installed and which simplifies the installation procedure.

A further object of the present invention is to provide an improved carpet underlay which enables under-carpet access after installation.

A further object of the present invention is to provide an improved carpet underlay having both end-to-end and side-to-side effective gripping characteristics.

Another object of the present invention is to provide a carpet underlay that is effective in holding carpet to the floor and providing improved dimensional stability to the carpet.

These objects and their attendant advantages are achieved in accordance with the present invention, where a carpet underlay comprising a polypropylene felt substrate has a non-aggressive latex-acrylic adhesive coating applied thereto by a dipping method, which renders the substrate both water impervious, dimensionally stable and efficiently manufacturable.

In accordance with the invention, the underlying substrate of the underlay is manufactured from "needle-punched" polypropylene fibers arranged to form a non-woven felt fabric, to which an acrylic latex pressure sensitive adhesive is applied by a dipping process that coats the surfaces of the fibers and fills the interstices between the fibers. This renders the felt substrate water impervious. The acrylic adhesive is applied to the felt substrate in a dip and squeeze operation. The felt substrate is run through a trough of adhesive and then passed through an excess adhesive removal station, for example, squeegies, dams, or rollers which remove excessive adhesive from the felt into the trough. At least one release foil is applied to the adhesive coating prior to a curing stage.

In an alternative embodiment, a pre-coat dip and squeeze step is included prior to application of the pressure sensitive adhesive. The purpose of a pre-coat is to control the degree of absorption of the pressure sensitive adhesive into the felt. The pre-coat step is essentially the same as that followed in application of the pressure sensitive adhesive, with the pre-coat composition supplanting the adhesive. Following the application and fixing of the pre-coat, the pre-coated felt fabric is directed to the pressure sensitive adhesive dip and squeeze process.

Advantageously, the pressure sensitive adhesive is selected to prevent accidental delamination of the underlay from the carpet, by ensuring sufficient adhesion to all surfaces, including the backing of the carpet and its underlying carpet fibers and the bare floor. Consequently, the carpet and underlay will tend to remain affixed together and also to the underlying floor while in use. When it is desired to have access to the floor or replace the carpet, the carpet can be easily lifted in combination, or separately from the underlay, without leaving undesirable residue on the underlying floor surface.

When installing the product, if done at the installation-site, contact cement is not used and traditional set time is avoided. The underlay is chosen according to the size of the carpet and after a layer of release foil on one side is removed, the adhesive side of the underlay is pressed against the floor. The release foil on the other side is partially removed and the carpet is placed in rolled form over the exposed adhesive area. The remainder of the release foil is peeled back and the carpet rolled in place as the release foil is peeled away from the underlay.

Alternatively, the carpet is then placed over the underlay at the exact location where it is to be installed. The carpet is then folded back halfway upon itself, and half of the exposed release foil is peeled off to expose one-half of the adhesive face of the side which is to be applied to the underlying surface of the carpet. The carpet is thereafter folded back on the underlying surface and the process is repeated with the other half of the underlay. The other half of the release foil is removed and after the remainder of the release foil is removed, the folded portion of the underlay is then folded back on the underlay to allow the full coating to adhesively grip the fibers of the backside of the carpet.

As should be apparent, the carpet underlay can be applied at a manufacturing location so that carpet ready for installation can be readily handled and shipped. The underlay is particularly intended, however, for installation of contract carpet on a bare floor, for example, cement, to avoid use of contact adhesive and permit underfloor access or carpet removal without undesirable residue being left on the floor.

BRIEF DESCRIPTION OF THE DRAWINGS

The invention is illustrated in the accompanying drawings wherein like parts are identified with like characters throughout the center views and in which FIGS. 1 and 2 each show a schematic cross sectional view of the typical prior art carpet produced using a primary backing of the prior art.

DESCRIPTION OF THE PREFERRED EMBODIMENTS

Figure 1:
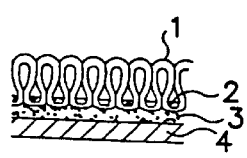
Figure 2:
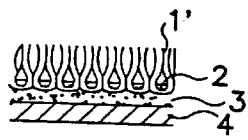

FIG. 1 shows a typical prior art carpet in fragmentary cross section including pile or face yarns 1 of the loop type, which are tufted into a primary backing 2 with the tufts locked in place by a suitable latex 3 to which is adhered a secondary back 4. FIG. 2 is similar to FIG. 1, except that face yarns 1' are of the cut type. A carpet of the type shown in FIGS. 1 and 2 may generally vary in size and frequently is laid wall to wall and adhered to a bare floor surface 5 by a contact glue or contact cement 6.

Figure 3:
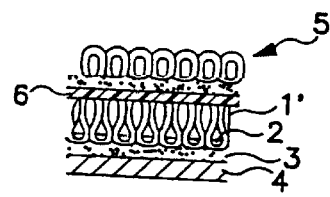
FIG. 3 shows a schematic cross sectional view of a carpet applied to a floor utilizing the underlay of the present invention.
Figure 4:
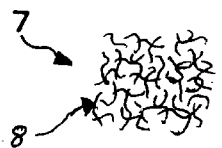
FIG. 4 shows a fragmentary plan view of the substrate felt fabric employed in the present invention.

In accordance with the present invention, as seen in FIG. 3, a carpet underlay 7' is placed between the floor surface 5 and the underside of carpet C. Carpet underlay 7' includes an underlay 7 having a plurality of filaments or fibers 8 saturated with a pressure sensitive adhesive 9, as shown in FIG. 4. The fabric of underlay 7 is a non-woven "needle punch" synthetic plastic felt, preferably polypropylene, such as, for example, the Amoco Duon product, style 4841, manufactured by Amoco fabrics & Fibers, Atlanta, Ga. Preferably the felt underlay 7 is a 4-ounce felt, however other weights are suitable, depending on the fullness or cushion effect desired.

The synthetic plastic used for the yarns of the substrate material include those comprised of any of the synthetic plastic materials capable of formation into non-woven felt fabric. Such plastics include, for example, polyethylene, polypropylene, ethylene/propylene co-polymers, numerous other polymers and co-polymers of other alpha-olefins, polyesters, polyimides, rayon, polyvinyl chloride and many other synthetic plastic materials. The invention is most especially applicable to those primary backings comprised of non-woven, needle-punched polypropylene fibers.

FIG. 4, in accordance with the present invention, shows the underlay 7 as including fibers 8, in the form of randomly oriented monofilaments of any desired cross section, which are crowded together to form a felt fabric having two substantially flat opposing surfaces with relatively small interstices formed between adjacent fibers, which are filled with a pressure sensitive adhesive 9.

Figure 5:
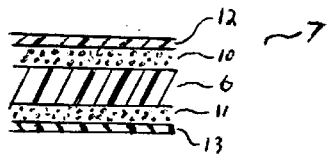
FIG. 5 shows a schematic cross sectional view of the underlay of the present invention.

FIG. 5, in accordance with the present invention, shows the carpet underlay 7 as having applied throughout, the pressure sensitive non-aggressive latex acrylic adhesive 9, which forms thin layers 10 and 11, to which is applied a polymer release film 12 and 13, respectively. By non-aggressive, it is meant an adhesive that permits the carpet to be readily lifted from the underlay or the underlay from the bare floor when desired.

Pressure sensitive non-aggressive adhesive 9, forming layers 10 and 11, preferably is an acrylic copolymer emulsion having a glass transition temperature between −30 and −46 degrees centigrade. In an alternative embodiment, the pressure sensitive adhesive is a composition including 57.0–89.0% acrylate polymer dispersion, 10.0–42.0% calcium carbonate, and 0.25–1.0% ammonium polyacrylate.

Figure 6:
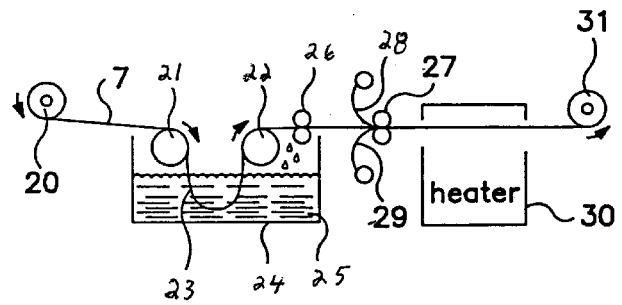
FIG. 6 illustrates the manner of applying the adhesive coating of the substrate of FIG. 5.

FIG. 6 shows the manner of fabricating the underlay of the present invention. To this end, the non-woven needle-punched felt fabric web 7 is unwound from a roll 20 and passed over drums 21, 22 to form a loop of the fabric 23 therebetween. A trough 24 contains a supply of pressure sensitive adhesive 25 in which the loop 21 extends below the level of the adhesive. The adhesive saturated fabric web 7' is drawn through a pair of rollers 26 positioned over the supply trough 24, which causes excess adhesive to be squeezed out and returned to the trough 24, while simultaneously assuring that the adhesive penetrates and fills the interstices between the fibers. The fabric web 7' is passed through a pair of pinch rollers 27, which apply a release film 28 and 29 to respective opposing surfaces of the adhesive coated fabric web 7'. Release films 28 and 29 comprise a thin plastic material and cover the pressure sensitive adhesive on both sides of fabric web 7'. The pinch rollers 27 apply a slight pressure as the material is drawn through the rollers, thereby pressing the release films to the adhesive. The resultant product is drawn through a heater 30 for curing and then stored on a take-up roll 31.

Figure 7:
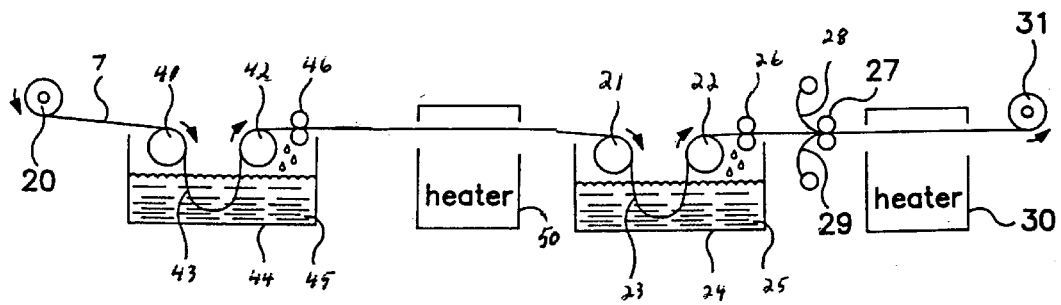
FIG. 7 illustrates the manner of applying a pre-coat before application of the adhesive coating of FIG. 6.

FIG. 7 shows the fabrication process of FIG. 6 modified to include application of a pre-coat to the felt web prior to step in which the web is dipped into the adhesive. The pre-coat is a composition of 55.0–88.0% styrene/butadiene polymer dispersion, 10.0–35.0% calcium carbonate, 2.0–10.0% starch and 0.25–1.0% sodium polyacrylate. In an alternative embodiment, the pre-coat is a composition of 44.0–78.0% styrene/butadiene polymer dispersion, 20.0–45.0% calcium carbonate, 2.0–10.0% starch and 0.25–1.0% sodium polyacrylate.

FIG. 7 shows a second, duplicate arrangement of the dip and squeeze apparatus located upstream of the arrangement shown in FIG. 6. The roll 20 of the non-woven needle-punched felt fabric web 7 is unwound and passed over drums 41, 42 to form a loop of the fabric 43 therebetween. A trough 44 contains a supply of pre-coat 45 in which the loop 41 extends below the level of the pre-coat. The adhesive saturated fabric web 7' is drawn through a pair of rollers 46 positioned over the supply trough 44, which causes excess pre-coat to be squeezed out and returned to the trough 44, while simultaneously assuring that the pre-coat penetrates and fills the interstices between the fibers. The resultant product is drawn through a heater 50 for curing and passed to roller 21 of the pressure sensitive adhesive dip and squeeze apparatus shown in FIG. 6. Optionally, the pre-coated fabric web 7' is stored on a take-up roll (not shown), interim storage, before subsequent application of adhesive.

In installation of the underlay to a carpet, an underlay of a width corresponding to that of the carpet is first selected. This may be a single width or several strips when laid side to side along their longitudinal dimension corresponding to the width of the carpet. For ease of handling, the underlay is preferably fabricated in three foot widths. However, widths of nine feet, twelve feet or fifteen feet can be readily accommodated. Any necessary trimming may be done prior to application of the underlay to the floor. The underlay is placed face down in a location selected. One layer of the release film, for example, layer 13, is removed from the underlay, and the adhesive side of the underlay is place on the floor. The other release film is then removed and the back or underside of the carpet is adhered to the underlay. The underlay is first adhered to the floor in the exact area in which the carpet is to be installed with the top release layer in place. Thereafter, the exposed release foil is cut along the fold line and peeled off to expose one half of the adhesive. The carpet is then rolled out or folded back on the adhesive surface which contacts the back side of the carpet. The remainder of the polymer release film is peeled off, exposing the other half of the adhesive. The other half of the carpet is then folded down and rolled onto the adhesive layer so that the entire adhesive coating of the underlay rests against and grips the backside of the carpet, causing the carpet to be gripped firmly to the carpet surface. If desired, the release layer may include tear lines to facilitate separation of the film.

In an alternative installation of the carpet to the underlay, the underlay is intended for installation of contract carpet on a bare floor, for example, cementations floor, and allows the carpet to be readily removed or replaced, thus providing under-carpet access without having undesirable glue residue.

After the carpet is initially installed, it easily can be peeled upwardly, away from the underlying carpet or bare floor for replacement. Any well known pressure sensitive non-aggressive latex acrylic may be utilized. Preferably, the latex acrylic adhesive functions as a pressure sensitive adhesive and is selected and arranged to prevent or minimize leaving a residue on any surface to which the underlay has been adhered. In one embodiment, the pressure sensitive adhesive is 30% latex and 70% pressure sensitive adhesive. In a preferred embodiment, the pressure sensitive adhesive is an acrylic copolymer emulsion having a glass transition temperature between −30 and −46 degrees centigrade. In another preferred embodiment, the pressure sensitive adhesive is a composition including 57.0–89.0% acrylate polymer dispersion, 10.0–42.0% calcium carbonate and 0.25–1.0% ammonium polyacrylate.

In still another embodiment, the underlay includes a pre-coat applied to the felt for controlling the absorption of pressure sensitive adhesive by the felt fabric, the pre-coat being a composition of 55.0–88.0% styrene/butadiene polymer dispersion, 10.0–35.0% calcium carbonate, 2.0–10.0% starch and 0.25–1.0% sodium polyacrylate. In an alternative embodiment, the underlay includes a pre-coat applied to the felt, the pre-coat being a composition of 44.0–78.0% styrene/butadiene polymer dispersion, 20.0–45.0% calcium carbonate, 2.0–10.0% starch and 0.25–1.0% sodium polyacrylate.

While this invention has been described in conjunction with specific embodiments thereof, it is evident that many alternative modifications and variations will be apparent to those skilled in the art. Accordingly, the preferred embodiments of the invention as set forth herein are intended to be illustrative, not limiting. Various changes may be made without departing from the true spirit and scope of the invention as defined herein and the following claims.

What is claimed is:

1. A method for making a pressure sensitive, releasable carpet underlay comprising the step of:
    coating a felt web at a coating station with a pressure sensitive non-aggressive adhesive, said pressure sensitive non-aggressive adhesive being a composition including 57.0–89.0% acrylate polymer dispersion, 10.0–42.0% calcium carbonate, and 0.25–1.0% ammonium polyacrylate.

2. The method of claim 1 wherein the pressure sensitive non-aggressive adhesive comprises an acrylic copolymer emulsion having a glass transition temperature between −30 and −46 degrees centigrade.

3. The method of claim 1 further comprising pre-coating the felt web prior to application of the adhesive for controlling the absorption of the adhesive.

4. The method of claim 1 further including:
    transporting said coated web from the station where the pressure sensitive non-aggressive adhesive is applied to an excess adhesive removing station; and
    removing excess pressure sensitive non-aggressive adhesive from the web.

5. The method of claim 1 further including applying a peelable protective liner to at least one side of said webs.

6. The method of claim 1 further including:
    transporting said web from said pinch rolls through a dryer; and
    storing the web on a roll for future use.

7. The method of claim 4 wherein the step of removing excess pressure sensitive non-aggressive adhesive includes the steps of:
    passing said web through a pair of pinch rolls so that said web is squeezed by said pair of pinch rolls to squeeze excess pressure sensitive adhesive from said web.

* * * * *